United States Patent
Branson

[11] Patent Number: 5,829,238
[45] Date of Patent: Nov. 3, 1998

[54] BALE ACCUMULATOR

[76] Inventor: Harlan Richard Branson, 1005 Border Dr., Bottineau, N. Dak. 58318

[21] Appl. No.: 695,080
[22] Filed: Aug. 8, 1996
[51] Int. Cl.$^6$ ................................................. A01D 75/04
[52] U.S. Cl. .............................. 56/475; 56/480; 414/111
[58] Field of Search .................................. 56/473.5, 474, 56/475, 476, 480; 414/11, 334, 343

[56] References Cited

U.S. PATENT DOCUMENTS

| | | | |
|---|---|---|---|
| 1,763,446 | 6/1930 | Sancken | 56/476 |
| 2,649,982 | 8/1953 | Ray | 56/474 |
| 3,189,387 | 6/1965 | Nieto | 56/476 X |
| 4,053,064 | 10/1977 | Stewart | 414/111 |
| 4,215,964 | 8/1980 | Schrag et al. | 414/111 |
| 4,249,842 | 2/1981 | Johnson | 414/24.5 |

FOREIGN PATENT DOCUMENTS

| | | | |
|---|---|---|---|
| 2414293 | 9/1979 | France | 414/111 |
| 2431824 | 3/1980 | France | 414/111 |
| 2054452 | 2/1981 | United Kingdom | 414/111 |

OTHER PUBLICATIONS

Hoelscher, *Bale Handling Equipment for Today's Farmer,* Brochure of various pieces of bale handling equipment.

*Primary Examiner*—John A. Ricci
*Attorney, Agent, or Firm*—Curtis V. Harr

[57] ABSTRACT

A hay bale accumulator is disclosed. This accumulator is made up of a bale platform on pivotal wheels. This platform is attached to a solid hitch at the back of a baler. The attachment point of the platform to the hitch contains a hydraulicly operated system that allows the platform to move from side to side in reference to the hitch. This hydraulic system is also used to lower and raise the platform. The platform is designed to hold two large rectangular bales at a distance off of the ground. The accumulator works by catching a large rectangular bale as it is ejected out of a baler. A sensor on the platform will then activate the hydraulics causing the platform to shift to the side. This shifting places an open space on the platform behind the baler. When a second bale is ejected it will be placed on the platform by the first and a second sensor will be activated. This sensor will cause the hydraulic system to lower the platform and allow the bales to drag on the ground. This action effectively drags the bales off of the platform. Upon unloading, the platform will return the raised position ready to begin the process over.

12 Claims, 7 Drawing Sheets

BALE ACCUMULATOR

BACKGROUND OF THE INVENTION

The present invention relates to an improvement in the manner in which a farmer, during the hay baling process, distributes large, rectangular bales of hay throughout the field for later collection. More specifically, the present invention discloses a bale wagon that when pulled behind a baler will distribute bales throughout a field in pairs.

In the past, the hay baling process consisted of moving a baler through a farmer's field collecting hay, compacting it and fastening it into, rectangular bales. Typically these bales were of a common size that could be moved manually by a farmer. Often a large bale cart or wagon could be pulled behind a baler to collect the bales. As bales were made by the baler they would be pushed into the wagon and accumulated in an unorganized pile for later unloading and stacking. Due to the relatively small size of typical rectangular bales it is often necessary to use a great deal of manual labor to either unload a bale wagon and stack the bales or to gather the bales throughout the field where they might be spread.

One solution to the inefficiency of small rectangular bales has been the large round or cylindrical bales, these bales are approximately six feet in diameter and require heavy equipment for moving and stacking. Although the size of these bales has solved many of the inefficiencies caused by small bales, they have created new problems. One of the problems discovered with the round or cylindrical bale was that they did not always stack efficiently in piles. Typically, round bales are stored or stacked in pyramid shaped piles. These pyramids of stacked cylinders do not stack as compactly as rectangular bales because these piles contain gaps or voids between the bales. This has proven to be somewhat inefficient, however a greater problem has been that the voids or gaps often expose a stacked bale to the elements and environment and as a consequence the bales decompose at greater rate then a stacked rectangular bale. A still further drawback of this type of bale was realized when the bales were hauled a great distance by semi trailers thus multiplying the inefficiency in stacking these type of bales.

The solution to the inefficiency of the standard rectangular bale and the large round bale stacking problems has led to the advent of the newer large square bales; these bales may be approximately 2'×3'×8'. The large rectangular bale, because of its size and weight, can no longer be piled in wagons or carts as could the smaller version, nor can they be stacked manually. Thus, the typical large rectangular bale is dropped in the field as the baler finishes making a bale and the farmer must later come by with equipment and individually move each bale. As a result, valuable time and energy is spent driving through the fields, stopping to pick up each individual bale.

From the foregoing discussion it can be seen that it would be highly desirable to provide a method of grouping hay bales together to reduce the time spent collecting them after the baling process. This result may be accomplished by causing the baler to retain one bale of hay until another bale is complete, and then to drop the two bales at the same location in the field. This would in turn reduce the time necessary for pick up of the bales from the field, as it would reduce the number of stops needed for collection.

SUMMARY OF THE INVENTION

It is the primary objective of the present invention to provide a method of grouping hay bales together in the field after the baling process for collection instead of distributing the bales individually.

Additionally, it is an objective of the present invention to provide a method for facilitating easier and faster collection of hay bales from the field after the baling process.

These objectives are accomplished by attaching a trailer or platform to the back of hay baler at the point which the completed hay bales are expelled. The trailer bed catches a completed bale, moves it to the side and holds it until a second bale of hay is expelled from the baler onto the trailer. When two bales are on the trailer, the bales are dropped to the ground from the back of the trailer. Thus, the bales are deposited in the field in pairs, in a side by side orientation rather than individually. The placement of the bales in pairs facilitates easier collection and can cut trips through the field while retrieving bales by fifty percent (50%).

More specifically the bale accumulator is made up of a bale platform on pivotal wheels. This platform is attached to a solid hitch at the back of a baler. The attachment point of the platform to the hitch contains a hydraulicly operated system that allows the platform to move from side to side in reference to the hitch. This hydraulic system is also used to lower and raise the platform. The platform is designed to hold two large rectangular bales at a distance off of the ground. The accumulator works by catching a large rectangular bale as it is ejected out of a baler. A sensor on the platform will then activate the hydraulics causing the platform to shift to the side. This shifting places an open space on the platform behind the baler. When a second bale is ejected it will be placed on the platform by the first and a second sensor will be activated. This sensor will cause the hydraulic system to lower the platform and allow the bales to drag on the ground. This action effectively drags the bales off of the platform. Upon unloading, the platform will return the raised position ready to begin the process over.

The type of sensors and their connection to the hydraulic control box can be of varying common arrangements. Often times it may be necessary to provide a relay between the senors and the hydraulic control box. Typically the configuration would use lever type sensors with a relay. However, other types of sensors such as optical or laser sensors could be substituted.

For a better understanding of the present invention, reference should be made to the drawings in which there is illustrated and described preferred embodiments of the present invention.

DESCRIPTION OF THE PREFERRED EMBODIMENT

Figure 1:
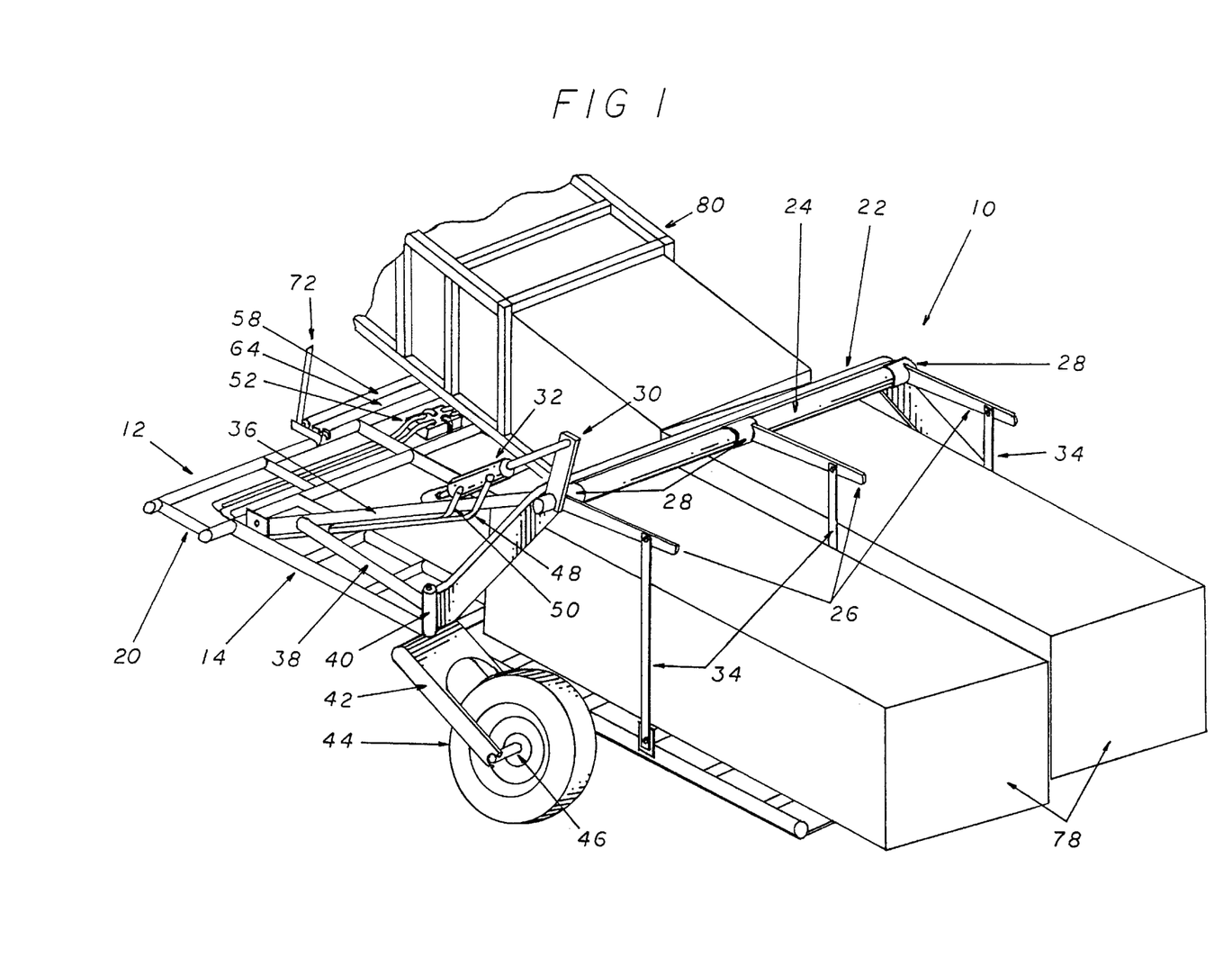
FIG. 1 is a perspective view of the Hay Bale Accumulator, showing the orientation of its major components in relation to one another and the manner in which bales are accumulated on said invention.
Figure 2:
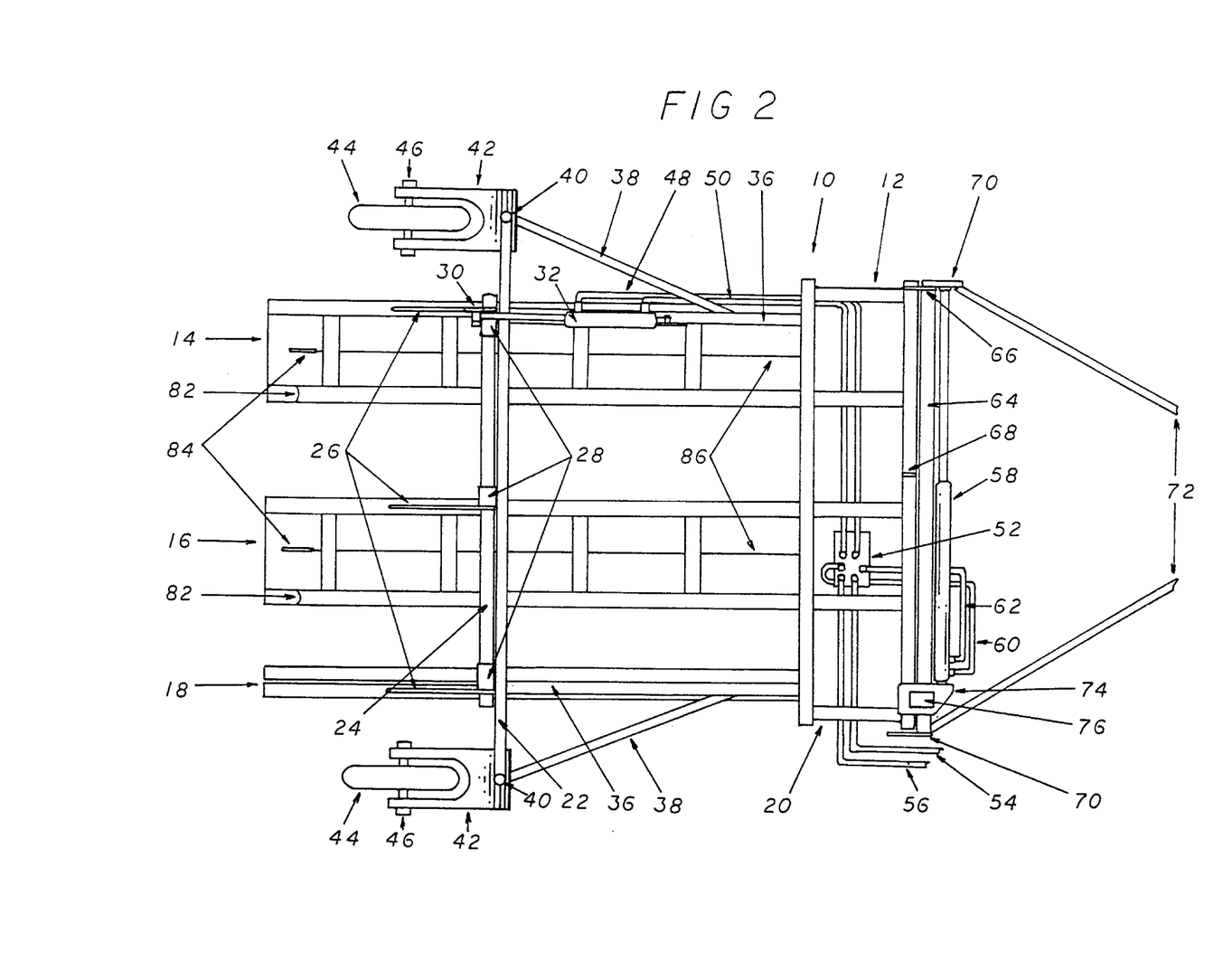
FIG. 2 is a top elevation view of the present invention showing the orientation of its major components in relation to one another, and more specifically, the orientation of the horizontal hydraulics system which moves the bale storage bed laterally.
Figure 3:
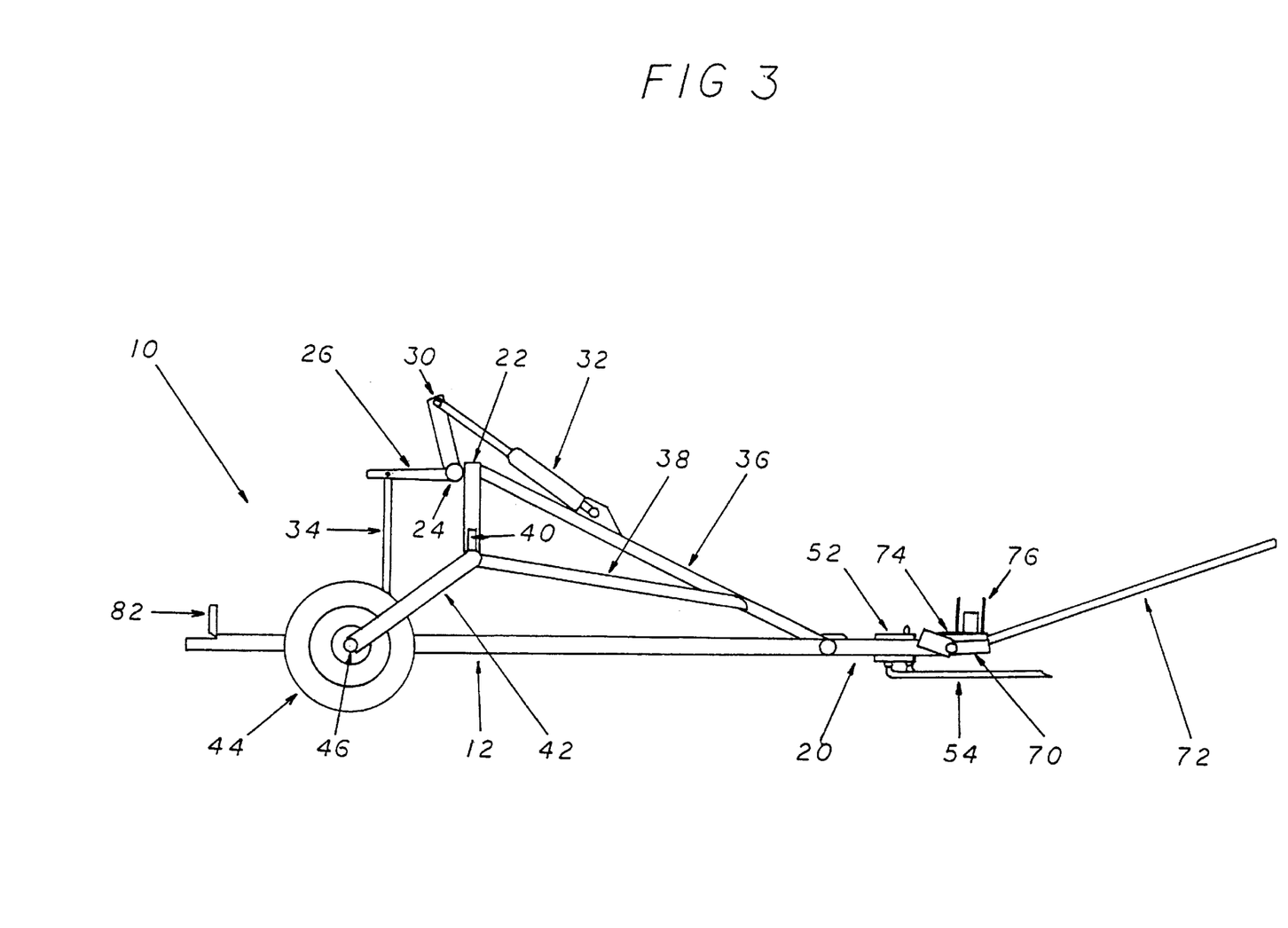
FIG. 3 is a side elevation view of the present invention showing the orientation of its major components in relation to one another, and more specifically, the orientation of the vertical hydraulic lifting systems which raises and lowers the storage bed during use.

Referring now to the drawings, and more specifically to FIGS. 1, 2 and 3, the Hay Bale Accumulator 10 is comprised primarily of a bale platform 12. The bale platform 12 is made up of a spanning ladder support frame 20 which forms the leading edge of the bale platform 12, and to which are perpendicularly attached the left bale ladder support frame 14, the center bale ladder support frame 16 and the right bale ladder support frame 18. These components extend rearward from the trailing edge of the spanning ladder support frame 20. This configuration provides a platform upon which the hay bales 78 are accumulated before unloading in the field. At this point it should be made clear that the support frame can be made of varying configurations. For example, instead of ladder support frames, box type arrangements could be substituted as well as box tubing or heavy rails. The substitution of these materials would not affect the operation of the bale accumulator 10.

Directly in front of the leading edge of the spanning ladder support frame 20 is attached the positioning bar 64 and directly in front of this is attached the positioning hydraulic cylinder 58. To either end of the positioning bar 64 are attached the positioning bar caps 70 to which on the most forward edges are attached the towing bars 72 which extend forward from that point to attach to any baling apparatus. The towing bars 72 provide the attachment point by which the present invention is towed behind a baling apparatus. Also assisting in attaching the Hay Bale Accumulator 10 to the baling apparatus is the frame mount 76, which is located at the front right portion of the spanning ladder support frame 20 and bolts directly to the lower surface of the baler 80.

Extending upward from and spanning the width of the bale platform 12 is the upper lift support member 22. The principal purpose of the upper lift support member 22 is to provide a structural member that will allow for the raising and lowering of the bale platform 12. (The lowering of the bale platform 12 allows for the removal of accumulated hay bales 78 while in use.) The upper lift support member 22 provides the attachment point for the upper lift rotation bar 24 to which are permanently attached the lift arms 26 through the upper lift attachment 28. The lift arms 26 extend rearward from the upper lift rotation bar 24, parallel to the bale platform 12. The lift arm connecting bars 34 extend down from the rearward end of the lift arms 26 and connect with the bale platform 12. Thus, any rotational force applied to the upper lift rotation bar 24 will cause the raising and lowering of the bale platform 12.

The structural support for the upper lift support member 22 is provided by the use of the straight upper frame support bars 36, which extends forward from the highest point of the upper lift support member 22 to the bale platform 12. Also extending forward from the most outer points of the upper lift support member 22 are the angled upper lift support bars 38 which attach to the straight upper frame support bars 36 at a point just above the bale platform.

The rotational force necessary to raise and lower the bale platform 12 through the lift arms 26 and the lift arm connecting bars 34 is provided by the use of the rotational bar lever arm 30, which is permanently attached to the left end of the upper lift rotation bar 24. The rotation bar lever arm 30 extends upward and at its most upward end provides the attachment point for the platform lift hydraulic cylinder 32. This cylinder is attached at its lower end to the straight upper frame support bar 36. The platform lift hydraulic cylinder 32 is operated by the platform hydraulic cylinder high pressure line 48 and the platform hydraulic cylinder return line 50, which run forward to the hydraulic control box 52 located within the spanning ladder support frame 20. When hydraulic pressure is applied to the platform lift hydraulic cylinder 32, it forces the rotation lever arm 30 forward, thus lowering the bale platform 12.

The upper lift support member 22 also provides the attachment point for the wheels 44. This attachment is accomplished by the use of the wheel support pivots 40 which are located at the outermost ends of the upper lift support member 22. From these points and extending downward at a rearward angle are mounted the wheel supports 42 which span the wheels 44 and provide the attachment points for the wheel axles 46.

Located in the rear portions of the left ladder support frame 14 and the center ladder support frame 16 are the bale sensor switches 84, which are connected to the bale sensor switch wires 86, and the bale stop 82. This configuration controls the timing as to when the accumulated bales are dropped in the field. The bales 78 are fed from the rear of the baler 80 onto the bale platform 12. When two bales 78 are fully extended on the bale platform 12, the bale sensor switches will activate the hydraulic control box 52, which in turn activates the platform lift hydraulic cylinder 32, thus lowering the bale platform 12, whereby the two bales 78 will come in contact with the ground and be pulled free from the Hay Bale Accumulator 10 by its forward momentum.

Figure 4:
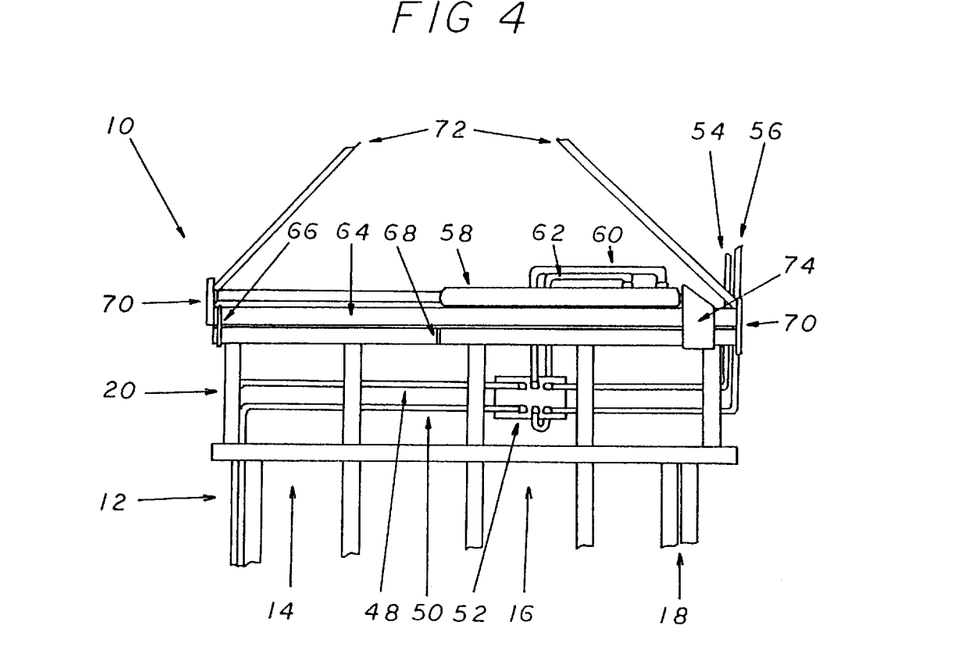
FIG. 4 is a top elevation view of the horizontal hydraulics system of the present invention shown in the open position used when loading the left side of the Hay Bale Accumulator.
Figure 5:
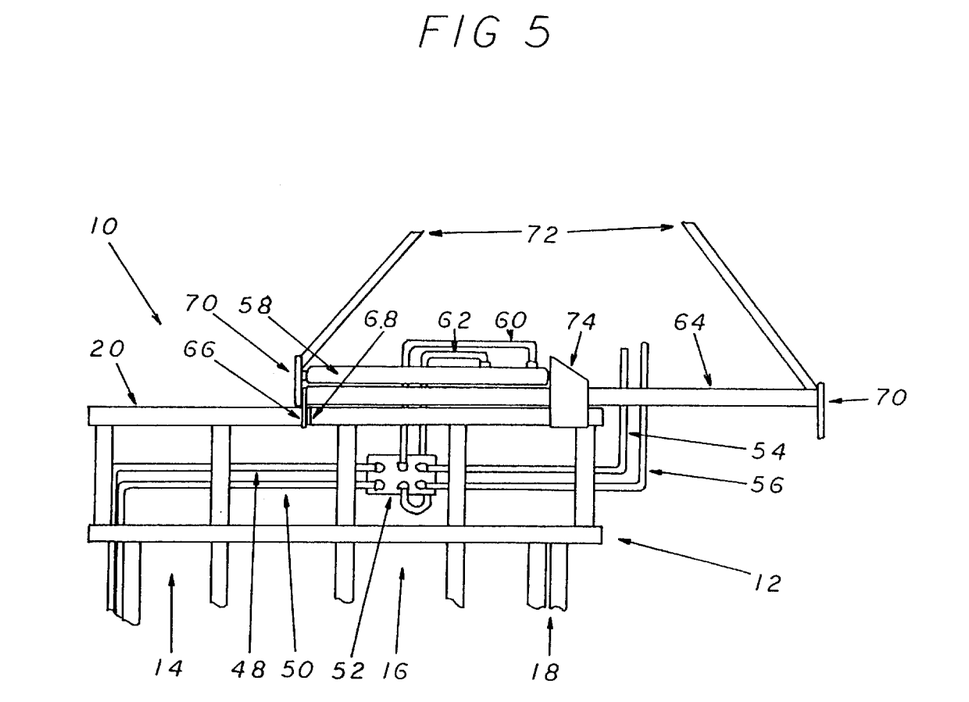
FIG. 5 is a top elevation view of the horizontal hydraulics system of the present invention shown in the closed position used when loading the right side of the Hay Bale Accumulator.

Referring now to FIGS. 4 and 5, the Hay Bale Accumulator 10 accomplishes the loading of two bales on the bale platform 12 by the use of the positioning hydraulic cylinder 58. The positioning cylinder 58 is connected at one end to the positioning bar cap 70 which is in turn connected at its most rearward end to the corresponding end of the positioning bar 64. The most forward end of the positioning bar cap 70 also provides the attachment point for the towing bar 72 on either side. Referring now to FIG. 4 it can be seen that the positioning bar cap 70 acts as a stop when the hydraulic cylinder 58 is fully extended as it reaches the outside edge of the spanning ladder support frame 20. Now referring specifically to FIG. 5 fixedly mounted on the most outward end of the positioning bar 64 is located the position bar stop plate 66 this plate 66 is mounted inside of the positioning bar 70 and extends rearward above the spanning ladder support frame 20. This positioning bar stop plate 66 limits the travel of the bale accumulator 12 when the hydraulic cylinder is in the closed position and the plate 66 contacts the positioning bar stop 68.

Referring again to both FIGS. 4 and 5 the hydraulic cylinder 58 is mounted at its other end to the position bar hydraulic cylinder mount block 74, which itself spans the positioning bar 64 and is fixedly mounted to the spanning ladder support frame 20. This configuration allows the positioning bar 64 to pass freely through the body of the mounting block 74 when the bale accumulator 10 changes position.

The positioning hydraulic cylinder 58 is activated and controlled by the high pressure hydraulic line 60 and the positioning hydraulic cylinder return line 62 which are in turn connected to the hydraulic control box 52. The bale sensor 86 is connected to the hydraulic control box 52. This configuration allows the electrical system and the hydraulic system to act in conjunction to automatically control the position of the components to position the bale accumulator and to release pairs of bales as needed. The hydraulic system of the present position is controlled by the main hydraulic high pressure line 54 and the main hydraulic cylinder return line 56 which are typically connected to the tractor.

Figure 6:
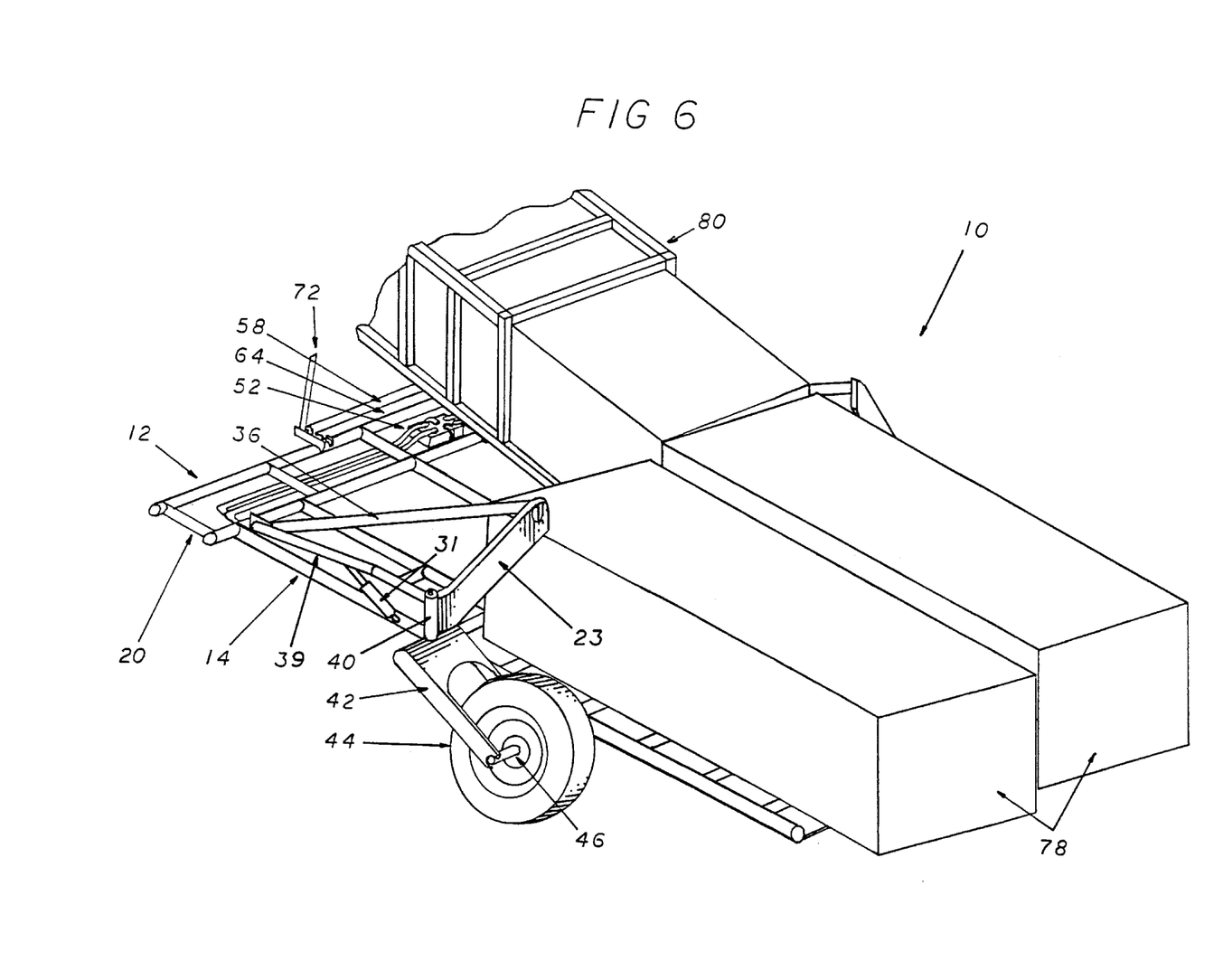
FIG. 6 is a perspective view of the Hay Bale Accumulator, showing an alternative embodiment of the present invention and the orientation of its major components in relation to one another and the manner in which bales are accumulated on said invention.
Figure 7:
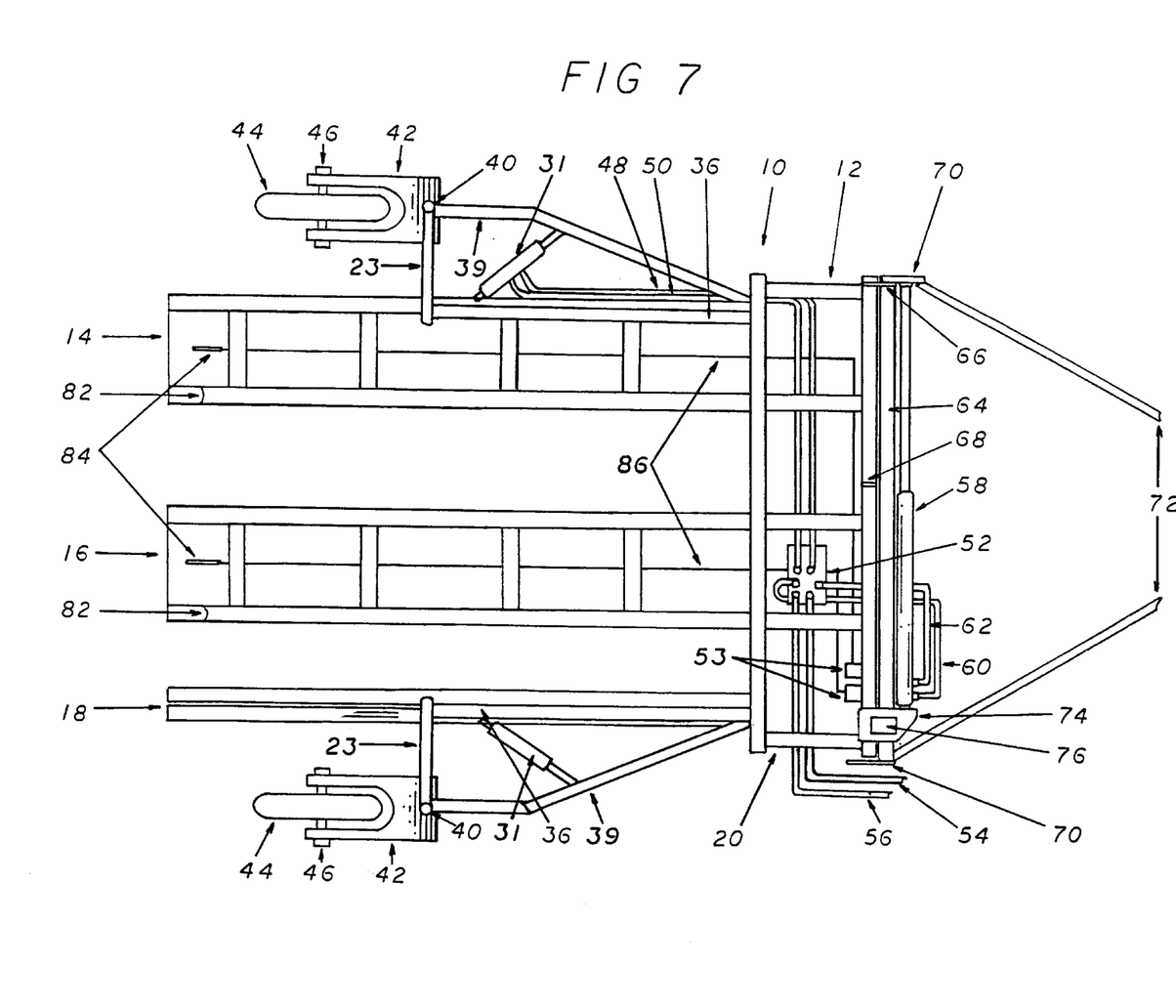
FIG. 7 is a top elevation view of an alternative embodiment of the present invention showing the orientation of its major components in relation to one another, and more specifically, the orientation of the horizontal hydraulics system which moves the bale storage bed laterally.
Figure 8:
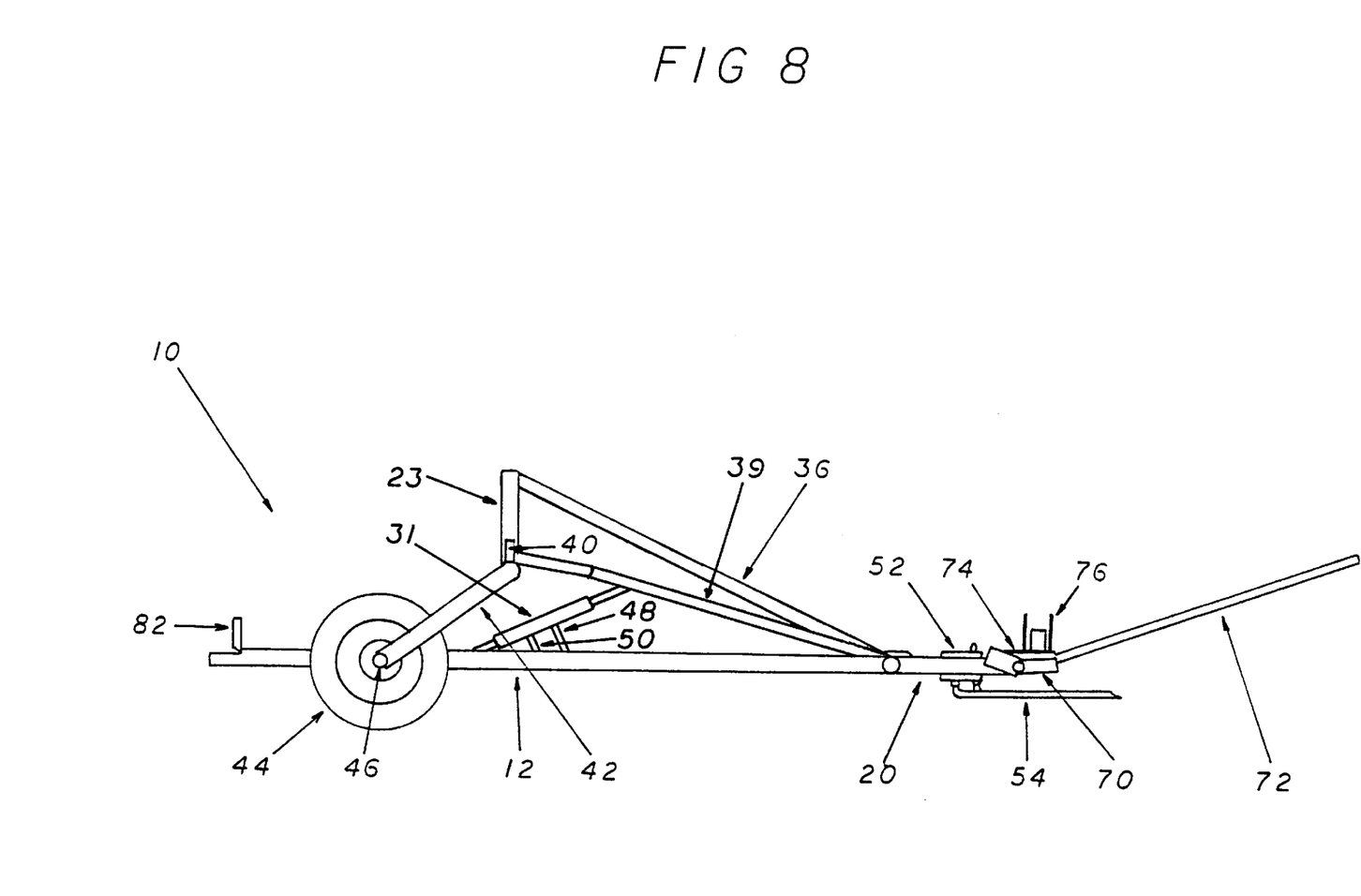
FIG. 8 is a side elevation view of an alternative embodiment of the present invention showing the orientation of its major components in relation to one another, and more specifically, the orientation of the vertical hydraulic lifting systems which raises and lowers the storage bed during use.

FIGS. 6, 7 and 8 depict an alternative embodiment of the present invention in which a number of different components have been incorporated into the design. This modification represents a design that allows for the free passage of bales with out upper obstructions. As can been seen this embodiment does not have the upper lift support member 22, the upper lift rotation bar 24, or the upper lift arms 26 as shown in FIGS. 1 through 5. The purpose of these components was to raise and lower the bale platform 12. In the alternative embodiment, the raising and lowering of the bale platform 12 is accomplished through the use of dual platform lift hydraulic cylinders 31, which attach at their lower ends to the bale platform 12, and at their upper ends to the modified support bar 39. The modified support bar 39, the straight frame support bar 36, and the shortened upper lift support member 23 form a triangular brace which supplies the structural support for the lifting and lower of the bale platform 12. Additionally, FIG. 7 depicts the use of relays 53 in conjunction with the sensing switches 84 in order to control the hydraulic system.

Although the present invention has been described in considerable detail with preference to certain preferred versions thereof, other versions are possible. Therefore, the spirit and scope of the appended claims should not be limited to the description of the preferred versions contained herein.

What is claimed:

1. A bale accumulator for use behind a baler of the type that forms individual rectangular bales and ejects them rearward one at a time, as said bales are made, this bale accumulator comprises:
    a hitch system having a front and rear portion, said front portion connected to said baler;
    a platform type trailer held above the ground by two or more wheels;
    a hydraulic positioning system connecting the rear portion of said hitch system to said platform type trailer, said positioning system being capable of moving said platform type trailer from side to side in reference to said hitch; and
    a hydraulic platform lift system, said system capable of raising and lowering said platform type trailer.

2. A bale accumulator as in claim 1 wherein said wheels are pivotally mounted.

3. A bale accumulator as in claim 2 further comprising a centrally controlled hydraulic system.

4. A bale accumulator as in claim 3 further comprising a system of electrical sensors connected to said hydraulic system, said sensor system being capable of detecting bales on said platform and controlling the function of said hydraulic system.

5. A bale accumulator and baling system comprising:
    a baler of the type that forms individual rectangular bales and ejects them rearward one at a time;
    a hitch system having a front and rear portion, said front portion connected to said baler;
    a platform type trailer held above the ground by two or more wheels;
    a hydraulic positioning system connecting the rear portion of said hitch system to said platform type trailer, said positioning system being capable of moving said platform type trailer from side to side in reference to said hitch; and
    a hydraulic platform lift system, said system capable of raising and lowering said platform type trailer.

6. A bale accumulator as in claim 5 wherein said wheels are pivotally mounted.

7. A bale accumulator as in claim 6 further comprising a centrally controlled hydraulic system.

8. A bale accumulator as in claim 7 further comprising a system of electrical sensors connected to said hydraulic system, said sensor system being capable of detecting bales on said platform and controlling the function of said hydraulic system.

9. A bale accumulator for use behind a baler of the type that forms individual rectangular bales and ejects them rearward one at a time, as said bales are made, said bale accumulator comprises:
    a hitch system having a front and rear portions, said front portion connected to said baler;
    a platform type trailer held above the ground by two or more wheels;
    a hydraulic positioning system connecting the rear portion of said hitch system to said platform type trailer, said positioning system being capable of moving said platform type trailer from side to side in reference to said hitch.

10. A bale accumulator as in claim 9 wherein said wheels are pivotally mounted.

11. A bale accumulator as in claim 10 further comprising a centrally controlled hydraulic system.

12. A bale accumulator as in claim 11 further comprising a system of electrical sensors connected to said hydraulic system, said sensor system being capable of detecting bales on said platform and controlling the function of said hydraulic system.

* * * * *